C. Van Alstine,
Reciprocating Saw-Mill.
N°887.   Patented Aug. 18, 1838.
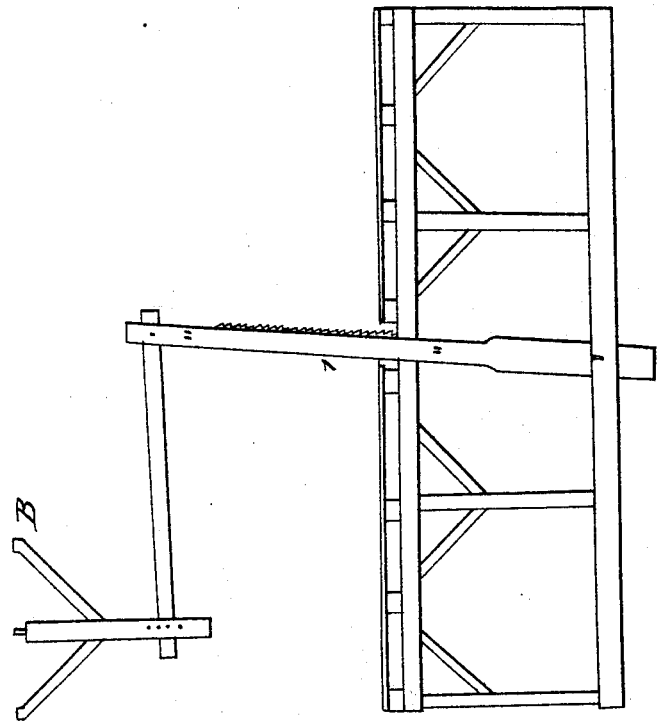
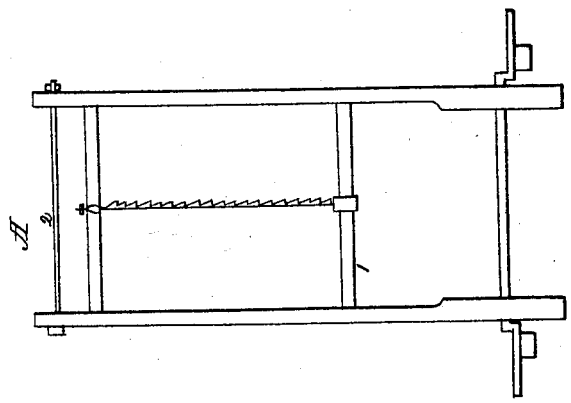

UNITED STATES PATENT OFFICE.

CORNELIUS VAN ALSTINE, OF MANLIUS CENTER, NEW YORK.

SAWMILL.

Specification of Letters Patent No. 887, dated August 18, 1838.

*To all whom it may concern:*

Be it known that I, CORNELIUS VAN ALSTINE, of Manlius Center, in the county of Onondaga and State of New York, have invented a new and useful Machine and an Improved Mode of Sawing; and I do hereby declare that the following is a full and exact description.

The nature of my invention consists in providing a double or two armed crank and placed in the bottom of a saw gate, which will enable the operation of sawing to be performed with a short crank, by the help of guide arms to the upper end of the saw gate, and the saw will clear herself by repeatedly drawing down the saw dust even with an inch crank only and in the much saving of power consequently when compared with the cranks used in the common saw mills.

To enable others skilled in the art to make and use my invention I will proceed to describe its construction and operation.

I construct my gate in the usual form of width and height between the girts as gates to other saw mills save the side pieces, which are longer exteriorly below the girts and largest transverse with the girts, and the girts are about square. The side pieces also extend above the girt sufficient for the reception of the guide arms, and extend below the lower girt, so as to leave length for the crank to pass through, and the side pieces are left larger below the lower girt about the crank, the same as pitmen are made in the now used saw mills, but if natural crooks can be had for side pieces I make use of them and let them come together, so as by framing a piece in the bottom of the saw gate let it extend down, so as to bolt the sides to it the crank will pass through the whole width and in this case the crank is in width between the arms to suit the width of the three coupled, and the crank is secured in the same manner in the side pieces by boxes, &c.

Explanation A: Figure 1 represents a back view of the saw gate as seen in the accompanying drawing. Fig. 2 is a bolt passing through the top of the gate above the upper girt high enough to not encroach on the top of the stirrup, is made fast in the gate and is to pass through the guide arms in the inside of the slides and against them. This and the bolt that passes through the other end of the guide arms should be round and perfectly smooth, for in them the bolts partially turn are kept snug by boxes and wedges kept fastened in by means of a screw from the upper side. Fig. 3 represents the cranks through the slides and lying on the sills may be of wrought or cast iron and secured with wear irons and washers against the sills and slides. The width of the crank is in accordance to the width of the gate, and the length of the arms to meet wishes and circumstances. I intend to make use of a balance wheel on one or each outside of the sills and the crank should be square from the outside of the sills out, if propelled by a flutter wheel then one balance wheel and if driven by a strap a whirl on one or both ends on the outside of the balance wheel, and it may be driven by gearing. The crank is kept on the sills in the usual way by a binder.

Explanation B: Fig. 1 represents a side view of the gate with the crank arms downwardly and the top of the gate inclined forward the length of the crank arm. Fig. 2 are the guide arms which are to be of suitable thickness according to the desired labor to be performed and the wider the less wear will be realized and the length of the arms equal to the distance from the bolt in the top of the gate to the lower edge of the lower girt and are placed in between two starts fastened in the upper part of the frame back of the gate, with a bolt passing through both pins below the level of the one in the top of the gate, the length of the arm of the crank down, and in those pieces there should be several holes for the purpose of lowering the arms to give rake to saw when she moves down. Those holes are put through on the circle of the arm when in the gate and by dropping down the other end you are taught the circle whereon to make the holes. The bolt in the starts should be made not to move but the arms turn on them. The guide arms are kept apart by a girt framed in between them, and the distance from the lower girt to where the crank should be placed in the side pieces is like the size and length of the timbers for the gate and guide arms are subject to much discretion, as it somewhat depends on the length of the saw and crank made use of. The mill I built to try the experiment I placed the crank in the side pieces below the lower girt equal to half the distance from the lower edge of the lower girt to the bolt in the top of the gate. I hang the saw in the same manner as in other saw mills save I give it no rake, which is done by lowering the back end of the guide-arms. I make use of fender ports faced with wear plates on both posts and side pieces and feed the same as do other saw mills by the motion of the saw gate, but much finer, as the revolutions may or will be much greater. It is also intended besides sawing lumber with the single to use it for sawing staves, &c., with a gang of saws, and I also secure the bottom of the side pieces by a stirrup bolted on and where it is desired make use of composition boxes, and in some instances I attach the side pieces of the saw gate to the wrist of the crank, that is to that part that pitmen are attached to the cranks now used, and the shank, i. e. the part inside of the arm of the crank and next to them, to rest on the crank sills and the power whirl or whirls fastened on and between the crank sills, viz. in instances where there is scant room and where there is sufficient power and speed to be had I make use of a flutter wheel and thus attach the crank to the side pieces of the gate.

What I claim as my invention and desire to secure by Letters Patent is—

The application of the crank to the bottom of the side pieces of the saw gate in combination with the guide arms, the whole constructed and operating substantially as herein described, using for the erection any material which will answer its purpose as the occasion may require.

CORNELIUS VAN ALSTINE.

Witnesses:
 JOHN MABIE,
 ELI COOK.